(12) United States Patent
Matthews, Jr.

(10) Patent No.: US 8,190,920 B2
(45) Date of Patent: May 29, 2012

(54) SECURITY FEATURES IN AN ELECTRONIC DEVICE

(75) Inventor: Donald P. Matthews, Jr., Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 792 days.

(21) Appl. No.: 11/856,363

(22) Filed: Sep. 17, 2007

(65) Prior Publication Data

US 2009/0077389 A1 Mar. 19, 2009

(51) Int. Cl.
*G06F 11/30* (2006.01)

(52) U.S. Cl. ......................................................... 713/193
(58) Field of Classification Search ................... 713/193
See application file for complete search history.

(56) References Cited

U.S. PATENT DOCUMENTS

| | | | |
|---|---|---|---|
| 6,385,727 B1 * | 5/2002 | Cassagnol et al. | 713/193 |
| 6,457,126 B1 * | 9/2002 | Nakamura et al. | 713/166 |
| 7,123,722 B2 | 10/2006 | Filipi-Martin et al. | 380/279 |
| 7,228,568 B2 | 6/2007 | Abe et al. | 726/31 |
| 7,257,707 B2 | 8/2007 | England et al. | 713/164 |
| 7,269,257 B2 | 9/2007 | Kitaya et al. | 380/45 |
| 7,350,238 B2 * | 3/2008 | Abe et al. | 726/29 |
| 7,412,053 B1 * | 8/2008 | Lyle | 380/2 |
| 2003/0046593 A1 * | 3/2003 | Xie et al. | 713/202 |
| 2004/0010468 A1 * | 1/2004 | Abe et al. | 705/50 |
| 2004/0117632 A1 * | 6/2004 | Arling et al. | 713/182 |
| 2004/0223610 A1 * | 11/2004 | Henry et al. | 380/37 |
| 2005/0071661 A1 * | 3/2005 | Yamada | 713/193 |
| 2005/0182934 A1 * | 8/2005 | Elteto | 713/169 |
| 2006/0018465 A1 * | 1/2006 | Saeki et al. | 380/44 |
| 2006/0107057 A1 * | 5/2006 | Lewis et al. | 713/176 |
| 2007/0061571 A1 * | 3/2007 | Hammes et al. | 713/168 |
| 2007/0083704 A1 | 4/2007 | Watanabe et al. | 711/112 |
| 2007/0110236 A1 * | 5/2007 | Tada | 380/201 |
| 2007/0192630 A1 | 8/2007 | Crane et al. | 713/193 |

\* cited by examiner

*Primary Examiner* — Kambiz Zand
*Assistant Examiner* — Teshome Hailu
(74) *Attorney, Agent, or Firm* — Cesari & Reed, LLP; Kirk A. Cesari

(57) ABSTRACT

A method of establishing security in an electronic device. The method includes generating a statistically unique root key value and storing the root key value in a one-time programmable memory of the device. The method also includes isolating firmware in the device from access to the root key value. The root key value is used as a root of trust that ensures that each electronic device has its own key. In general, the root key is used to encrypt other keys in the device. In different aspects, a root key test value, which is utilized to test the root key, and other security features such as a re-purpose number and a cipher block chaining re-purpose value are included to protect the electronic device from unauthorized access. An electronic device that includes these security features is also provided.

17 Claims, 4 Drawing Sheets

SECURITY FEATURES IN AN ELECTRONIC DEVICE

FIELD

The present aspects relate generally to control of access to circuitry and/or information in electronic devices. More particularly, the present aspects relate to security features in electronic devices.

BACKGROUND

Electronic devices, such as disc drives and solid state data storage devices, contain information that must be protected from unauthorized external observation and control. However, in many cases, schemes for prevention of unauthorized access to information in such electronic devices are primarily implemented in the host computer, with the electronic device having little or no control over the operation of these schemes. Lack of control over such schemes within the device is problematic in different situations. For example, if the device is removed from the original host computer, confidential user data is no longer protected. In general, there is a need for better security in electronic devices.

Aspects of the present disclosure provide solutions to these and/or other problems, and offer other advantages over the prior art.

SUMMARY

A method of establishing security in an electronic device is provided. The method includes generating a statistically unique root key value and storing the root key value in a one-time programmable memory of the device. The method also includes isolating firmware in the device from access to the root key value. The root key value is used as a root of trust that ensures that each electronic device has its own key. In general, the root key is used to encrypt other keys in the device. In different aspects, a root key test value, which is utilized to test the root key, and other security features such as a re-purpose number and a cipher block chaining re-purpose value are included to protect the electronic device from unauthorized access. An electronic device that includes these security features is also provided.

These and other features and benefits that characterize aspects of the present disclosure will be apparent upon reading the following detailed description and review of the associated drawings.

DETAILED DESCRIPTION

Figure 1:
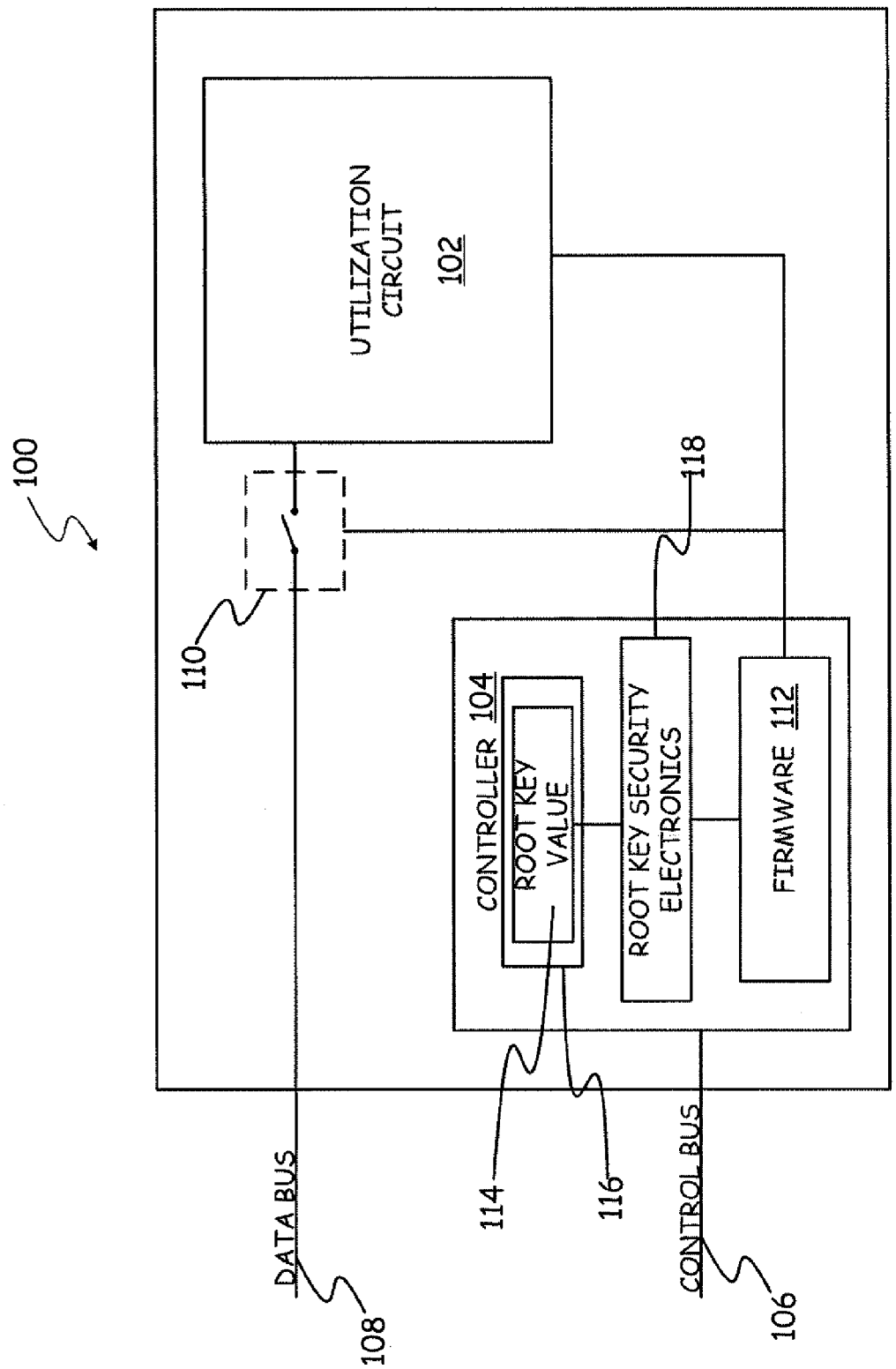
FIG. 1 is a simplified block diagram that illustrates an electronic device with security features.

Referring now to FIG. 1, a simplified block diagram of an electronic device 100, which includes security features in accordance with the present aspects, is shown. Device 100 includes, as its primary components, a utilization circuit 102, a controller 104, a control bus 106, a data bus 108 and a switch 110. Electronic device 100 receives commands and information form external devices via control bus 106 and data bus 108. In general, utilization circuit 102 can be any type of electronic circuit. Specific examples of utilization circuits that include data memories are described further below.

Controller 104, of device 100, can include one or more processors (represented as firmware 112) that help carry out various functions within the controller 104. In accordance with the present aspects, controller 104 includes security features that control access to utilization circuit 102 via data bus 108. Security features within controller 104 include a statistically unique root key value 114, which is stored in a one-time programmable memory 116 of device 100. The root key value 114 is used as a root of trust that ensures that each device has its own key. The statically unique root key value can be generated by any suitable random number generation mechanism that is stored within electronic device 100. Alternatively, the random number generation mechanism can be in a device that is external to the electronic device 100. Here, the generation of the root key value 114 is carried out externally, and the value obtained is stored in one-time programmable memory 116. It should be noted that, even if the root key value 114 is generated external to device 100, once the value is stored in one-time programmable memory 116, it is not usually preserved anywhere outside device 100. The random number generation mechanism can include hardware and/or software. As can be seen in FIG. 1, controller 104 also includes root key security electronics 118, which is a component that isolates firmware 112 in device 100 from access to the root key value 114. In general, any processing of commands that involves exposing of the actual root key value 114 is carried out within root key security electronics 118, and only status values corresponding to the commands are returned to the firmware 112.

As noted above, root key value 114 is used as a root of trust that ensures that each device has its own key. In general, root key value 112 is used to encrypt passwords and others keys within electronic device 100. In an example aspect, electronic device 100 requires a valid password before it grants access to utilization circuit 102 through data bus 108 via switch 110. It should be noted that the valid password stored in device 100, either within controller 104 or in utilization circuit 102, is encrypted with root key value 114. Thus, when an entered password is communicated to controller 104 via control bus 106, it undergoes root key processing before it is compared with the valid password. Only if the entered password, upon encryption with the root key value 114, matches the valid password, switch 110 is closed and access is allowed to utilization circuit via data bus 108. During the password validation process, the root key value 114 is isolated from the firmware 112 by root key security electronics 118.

As noted earlier, the root key value 114 is stored in a one-time programmable memory 116. Over time it is possible that, due to degradation of memory 116 or other events, the root key value 114 may change. To prevent problems from arising as a result of an altered root key value, a root key test value is employed to test the root key value 114. A root key test command that utilizes the root key test value to test the root key value 114 can be automatically executed at predetermined time intervals or in conjunction with other commands. In general, the root key test command can be executed at any suitable time. Details regarding the root key test value and other security features are described below in connection with FIGS. 2 and 3, which are specific examples of electronic device 100.

Figure 2:
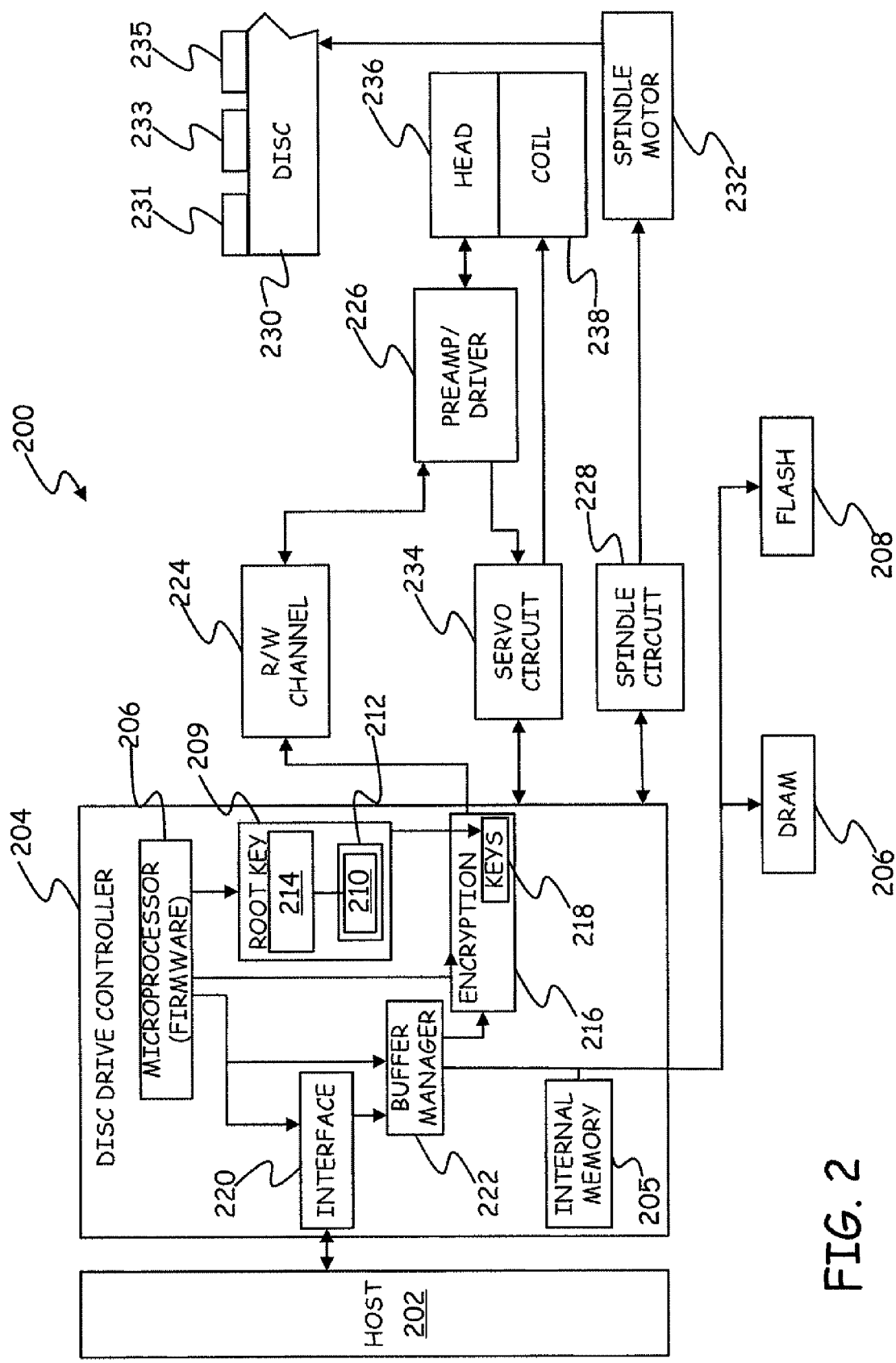
FIG. 2 is a simplified block diagram of a disc drive data storage device with security features.

FIG. 2 is a simplified block diagram of system that includes a disc drive 200, which is specific example of an electronic device that employs security features in accordance with the present aspects. A host computer 202 provides top level control of a disc drive controller 204, which in turn controls the operation of the disc drive 200 in accordance with programming and information stored in, for example, internal memory 205 and external memories such as dynamic random access memory (DRAM) 206 and non-volatile flash memory 208.

As can be seen in FIG. 2, disc drive controller 204 has security features that are similar to those included in controller 104 of FIG. 1. Specifically, in FIG. 2, firmware 206 is connected to root key block 209 in which root key value 210, which is stored in one time programmable memory 212, is isolated form firmware 206 by root key security electronics 214. Also included in controller 204 is an encryption block 216 in which encryption of data is carried out with the help of one or more encryption keys, which are included in keys block 218. Further, keys which may be stored in blocks 206, 208 and/or disc(s) 230 are encrypted with root key value 210. Encryption processing for keys in blocks 206, 208 and/or 230 is carried out by root key security electronics 214. General encryption-related functions such as enabling/disabling of encryption, setting up of parameters for encryption such as block sizes and other options are carried out in encryption block 216 under the control of firmware 206. It should be noted that the configuration shown in FIG. 2 for encryption processing is only an example and numerous other configurations, which utilize security features in accordance with the present aspects, are possible.

Data to be stored by the disc drive 200 are transferred from the host computer 202 to interface circuit 220 and then via buffer manager 222 that includes a data buffer for temporarily buffering the data prior to its encryption, which, as noted above, takes place in encryption block 216 under the control of microprocessor 206. A sequencer (not shown) directs the operation of a read/write channel 224 and a preamp/driver circuit 226 during data transfer operations. A spindle circuit 228 is provided to control the rotation of one or more data storage discs 230 by spindle motor 232.

A servo circuit 234 is provided to control the position of one or more recording heads 236 relative to the disc(s) 230 as part of a servo loop established by the head 236, the preamp/driver 226, the servo circuit 234 and coil 238 that controls the position of an actuator arm. The servo circuit 234 includes a digital signal processor (DSP) which is programmed to carry out two main types of servo operation: seeking and track following.

In FIG. 2, data storage discs 230, which are controlled by spindle circuitry (226 and 230), constitute a utilization circuit (such as 102 shown in FIG. 1). In an example aspect, access to the utilization circuit, via interface 220, is controlled by using password protection. In this example aspect, as in the case of the electronic device of FIG. 1, passwords are encrypted with root key value 210. Further, as noted above, encryption in disc drive 200 is carried out with the help of root key value 210.

As noted earlier, a root key test value is utilized to test the root key value. Further, encryption key test values are utilized to test encryption keys. Table 1 and Table 2 below show a root key test value and an encryption key test value, respectively.

TABLE 1

Root Key Test Value Fields

| Field Name | Description |
|---|---|
| Test Value | This is a test value for the root key value. It is a 128-bit predetermined fixed pattern. |
| Re-purpose Number | This value is incremented each time that the drive is re-purposed. This is used in conjunction with the loading of keys to ensure that the key that is loaded is has not been erased. |
| Fixed Wrap Key indicator | This a single bit that indicates whether a fixed wrap key has been utilized |

TABLE 2

Encryption Key Test Value Fields

| Field Name | Description |
|---|---|
| Test Value | This field is the value that is used to test the load key (encryption key or any other key). It is a 64-bit predetermined fixed pattern. |
| Re-purpose Number | This is the re-purpose number that was active when this key was created, if this number does not match the number from the root key test value, then this key was not created since the last re-purpose operation. |
| Extra bits | Used for padding out to a size that is a multiple of a block size used by an encryption algorithm. The extra bits are randomly generated. |

It should be noted that the root key test value shown in Table 1 is encrypted with the root key and stored in an encrypted form in the disc drive. One possible storage location for the encrypted root key test value is on disc 230. In FIG. 2, the encrypted root key test value is denoted by reference numeral 231 and encryption keys are denoted by reference numeral 233. In one aspect, executing a root key test command to test the stored root key value involves decrypting the root key test value with the root key value. Upon decryption, if the Test Value bits, correspond to the predetermined pattern, the stored root key value is accurate. If a different pattern is obtained, the stored root key has changed. To test a stored encryption key, as decryption process, first with the root key and then with the encryption key, is carried out and Test Value bits (described in Table 2) are compared with the predetermined pattern. It should be noted that these are highly specific examples for testing a stored root key and a stored encryption key and, in general, any test value fields of any suitable length may be used.

As noted in Table 1 above, the root key test value also includes a 16-bit re-purpose number. In accordance with the present aspects, each time a user re-purposes the drive (effectively erase it), the re-purpose number is incremented.

Also, as shown in Table 2 above, the encryption key test value also includes a 16-bit re-purpose number, which is a copy of the re-purpose number in the root key test value. In essence, if the re-purpose number in the encryption key test value does not match the re-purpose number of the root key test value, the encryption key will not be loaded and is not usable.

A security attack that incrementing of the re-purpose number prevents is when a user (person A) has re-purposed a drive and a buyer of the drive (person B) tries to load the old encryption key (from person A) to decrypt the contents on the drive. Since the re-purpose number does not match, the hardware (firmware/root key) will not allow the old encryption key to be loaded and person B cannot decrypt the contents of the drive.

In addition, the re-purpose number in the root key test value will only increment and will disable the security of the drive when it reaches a predetermined maximum value (FFFF, for example). This is implemented so that an attacker cannot continue to re-purpose the drive until the re-purpose number rolls over and matches the re-purpose number of the original user (person A). It should be noted that, instead of a 16-bit re-purpose number, the re-purpose number can include any suitable number of bits.

Encryption algorithms typically operate on data blocks of a predetermined size (for example, 128-bit blocks). For each data block, the data is either encrypted (plaintext to ciphertext) or decrypted (ciphertext to plaintext). One type of encryption involves encrypting each data block separately and independently without any links between the separate data blocks. Another type of encryption includes links between different encrypted data blocks. Cipher block chaining (CBC) is one type of encryption technique that, in general, links different encrypted data blocks. When an encryption algorithm is operating in CBC mode, the ciphertext that is produced by encrypting a block is XORed with the plaintext that is in the next block to be encrypted. Since the first block to be encrypted does not follow any previous encryption operation, there is no previous ciphertext to XOR with the first plaintext block. For the first block, a special initialization vector (IV) is used for the XOR operation.

In one aspect, the IV value is a value derived from the address for the data block that is being encrypted or decrypted. In a specific aspect, the derived IV is mixed with a CBC re-purpose value, which is random value generated by firmware, to change the encrypted data block based on the CBC re-purpose value. In an example aspect, the CBC re-purpose value is 64 bits in length. An example encryption block modified by a CBC re-purpose value is denoted by reference numeral 235. By adding the CBC re-purpose value, it makes it substantially harder for an attacker to brute force decode a previous owner's data.

For normal operations, a user will continue to use the drive and then will perform a re-purpose operation (to erase the drive) before discarding the drive (in this case by selling it). The new user can read the previous data (encrypted with the new key) and then decrypt the data externally to obtain the precious owner's encrypted data. It is now possible to perform a brute force attack on the previous owner's data (this is trial decryption with all possible keys). The CBC re-purpose value makes the brute force attack substantially more complex.

As noted above, the firmware will generate a new CBC re-purpose value that is randomly generated and therefore does not correspond with the re-purpose value that is a part of the root key value. It is possible for the firmware to have a single CBC re-purpose value for the entire drive or for it to have a different CBC re-purpose value for each key (a user can have multiple keys in use on a single drive).

In some aspects, device-related commands and keys can be escrowed (saved external to the device). To prevent such commands and keys from being disclosed to the firmware in the "clear," a user can establish a fixed wrap key. Once established, the fixed wrap key is utilized by the electronic device to encrypt commands and keys that are communicated between the electronic device and an external device that is operably coupled to the electronic device. As noted above, a fixed wrap key indicator (included in Table 1 above as part of the root key test value) is a single bit that indicates whether a fixed wrap key has been utilized.

As noted earlier, over time it is possible that, due to degradation of the one-time programmable memory or other events, the root key value may change and therefore, to prevent problems from arising as a result of an altered root key value, a root key test value is employed to test the root key value. It is also possible that the one-time programmable memory was never programmed with a root key value. Thus, in one aspect, the one-time programmable memory is examined to determine whether it has been programmed with a root key value. If no root key has been programmed, access to the utilization circuit of the electronic device is eliminated. If a root key value is present, normal processing continues.

Figure 3:
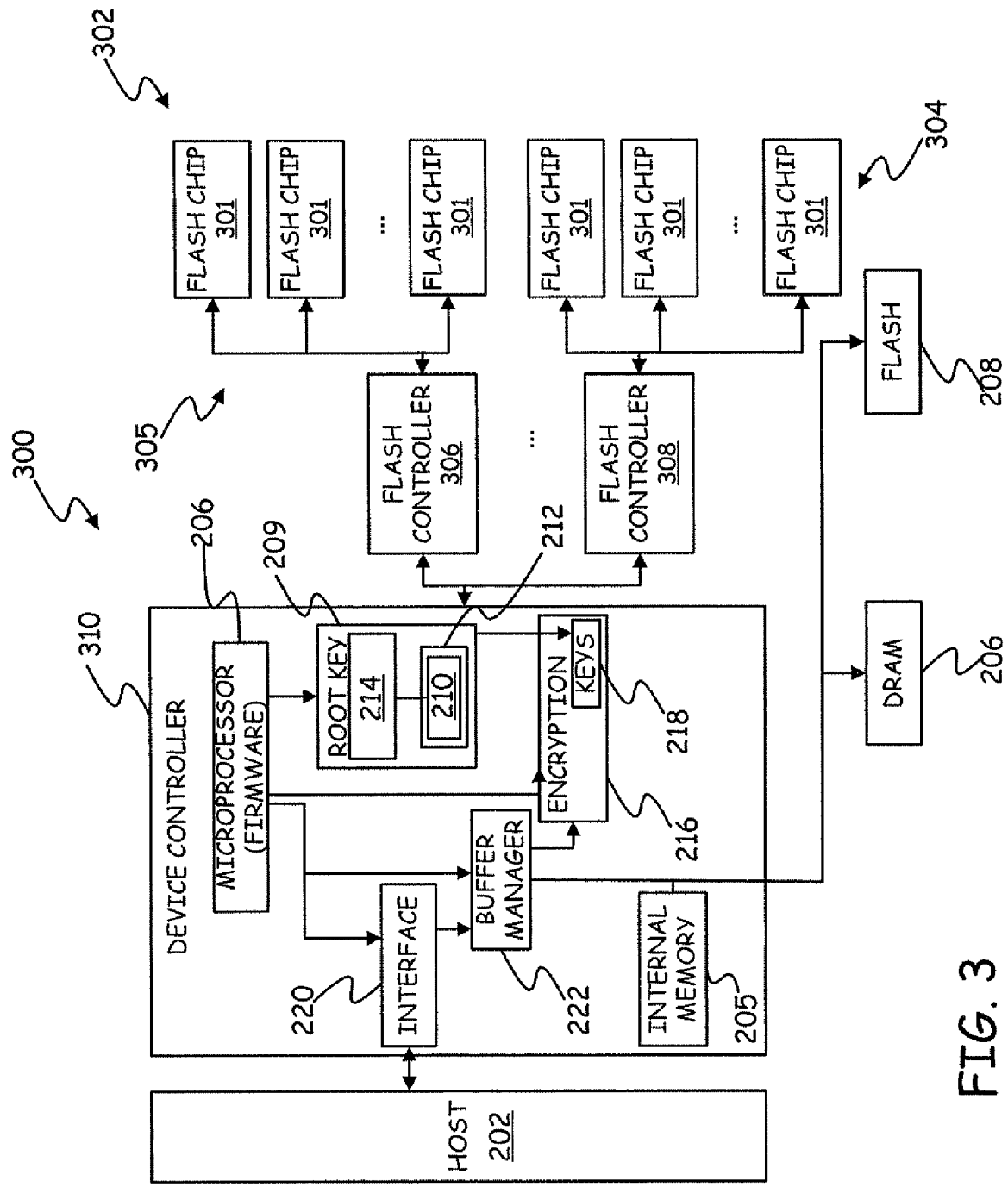
FIG. 3 is a simplified block diagram of a solid state data storage device with security features.

FIG. 3 is a simplified block diagram of a solid state data storage device 300 with security features. In contrast with disc drive data storage device 200 (of FIG. 2), which employs data storage media that rotate, device 300 has no moving parts. As can be seen in FIG. 3, device 300 includes multiple groups of flash memory chips (such as 302 and 304), with each group including a separate flash memory controller 306, 308. In FIG. 3, the flash memory is collectively denoted by reference numeral 305. Storage device 300 also includes a device controller 310 that communicates with individual flash memory controllers (such as 306 and 308). Device controller 310 operates in a manner similar to, and implements security features that are similar to those in, disc drive controller 204 and therefore its internal components are numbered with the same reference numerals used for corresponding components in FIG. 2. Further, since security-related operations in device 300 are substantially similar to the security-related operations in device 200, an explanation of these operations has not been repeated.

Figure 4:
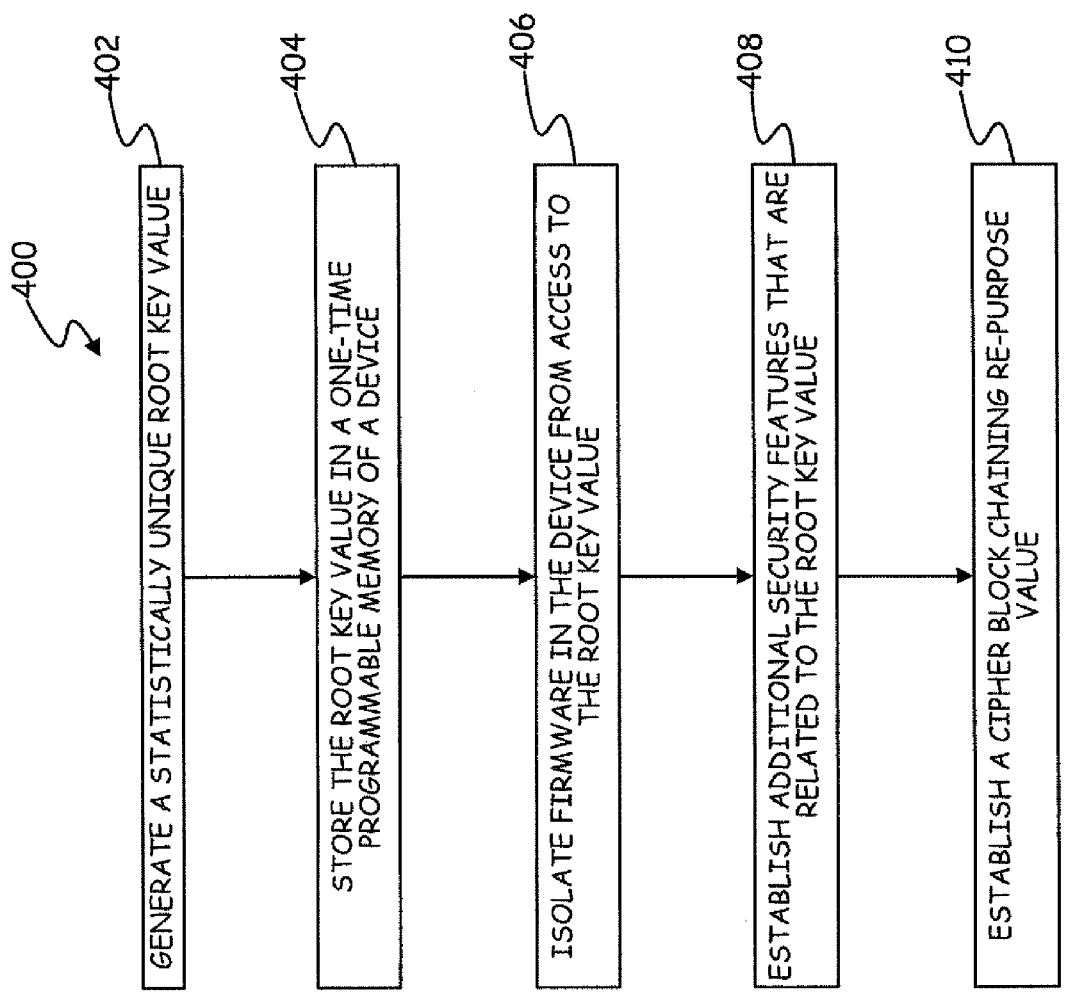
FIG. 4 is a simplified flowchart.

In conclusion, referring now to FIG. 4, a flowchart 400 of a method of establishing security in an electronic device is shown. A first step of the method involves generating a statistically unique root key value. This is illustrated at step 402. At step 404, the root key value is stored in a one-time programmable memory of the device. Firmware in the device is isolated from access to the root key value. This is illustrated at step 406. At step 408, additional security features that are related to the root key value are established. The additional security features include a root key test value, which is utilized to test the root key, and other security features such as a re-purpose number. All these features were described earlier in connection with FIGS. 1 through 3. Also, as noted earlier, at least one cipher block chaining re-purpose value, which is utilized to modify encrypted data stored in the data memory, is established. This is illustrated at step 410.

It is to be understood that even though numerous characteristics and advantages of various aspects of the disclosure have been set forth in the foregoing description, together with details of the structure and function of various aspects of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the electronic device while maintaining substantially the same functionality without departing from the scope and spirit of the present disclosure. In addition, although the preferred aspects described herein are directed to security features for a data storage device, it will be appreciated by those skilled in the art that the teachings of the present disclosure can be applied to any electronic device, without departing from the scope and spirit of the present disclosure.

What is claimed is:

1. A method comprising:
    examining a memory to determine if a root key value is stored within the memory;
    disabling access to a utilization circuit when the root key value is not stored within the memory;
    allowing processing of a password to determine access to the utilization circuit when the root key value is stored within the memory, including:
        comparing a first encrypted password to a second encrypted password, the second encrypted password encrypted via a root key value stored within the electronic device that is isolated from firmware within the electronic device;
        denying access to a utilization circuit when the first encrypted password does not match the second encrypted password; and
        providing access to the utilization circuit when the first encrypted password matches the second encrypted password.

2. The method of claim 1 further comprising:
    testing the root key value by utilizing a root key test value by:
        decrypting the root key test value with the root key value to produce test value bits;
        comparing the test value bits to a predetermined pattern;
        determining the root key value is accurate when the test value bits correspond to the predetermined pattern; and
        determining the root key value is not accurate when the test value bits do not correspond to the predetermined pattern.

3. The method of claim 2 further comprising:
    receiving a password at an electronic device;
    encrypting the password to produce a first encrypted password;
    encrypting data via a data encryption key to produce encrypted data; and
    storing the encrypted data in a memory of the electronic device.

4. The method of claim 3 further comprising:
    encrypting the data encryption key via the root key value to produce an encrypted data encryption key; and
    storing the encrypted data encryption key within the electronic device.

5. The method of claim 3 further comprising generating an encryption key test value to test the data encryption key.

6. The method of claim 5 wherein the root key test value comprises a re-purpose number which is incremented each time the data memory is substantially erased upon execution of a re-purpose command.

7. The method of claim 6 wherein the encryption key test value comprises the re-purpose number.

8. The method of claim 7 further comprising generating at least one cipher block chaining re-purpose value, which is utilized to modify encrypted data stored in the data memory as part of an erase operation of the data memory.

9. The method of claim 1 further comprising:
    wherein the disabling access to the utilization circuit when the root key value is not stored in the memory is done independently of any password received to access the utilization circuit.

10. The method of claim 1 further comprising:
    establishing a fixed wrap key; and
    utilizing the fixed wrap key to encrypt commands and keys that are communicated between the electronic device and an external device.

11. The method of claim 6 further comprising disabling access to the electronic device when the re-purpose number reaches a predefined maximum value.

12. An electronic device comprising:
    a controller including:
        firmware and at least one processor; and
        security features including:
            an access control module to control access to a utilization circuit, the access control module adapted to:
                examine a memory to determine if a root key value is stored within the memory;
                disable access to the utilization circuit when the root key value is not stored within the memory;
                allow processing of a password to determine access to the utilization circuit when the root key value is stored within the memory, including:
                    receive a first password;
                    encrypt the first password to produce a first encrypted password;
                    compare the first encrypted password to a second encrypted password stored within the electronic device, the second encrypted password encrypted via the root key value;
                    deny access to the utilization circuit when the first encrypted password does not match the second encrypted password;
                    allow access to the utilization circuit when the first encrypted password matches the second encrypted password; and
            root key security electronics adapted to isolate the firmware from access to the root key value.

13. The electronic device of claim 12 wherein the electronic device is a data storage device, the controller is a data storage controller, and the utilization circuit comprises at least one data storage medium.

14. The electronic device of claim 12 wherein the security features further comprise a stored root key test value and the controller is adapted to test the root key value via the root key test value.

15. The electronic device of claim 14 wherein the security features further comprise a data encryption key stored in a memory, wherein the data encryption key is encrypted with the root key value.

16. The electronic device of claim 15 further comprising an encryption key test value key stored in a memory and the controller is adapted to test the data encryption key via the encryption key test value.

17. The electronic device of claim 12 wherein the controller is adapted to determine a re-purpose value, which includes a count of a number of commands the controller has received to perform a certain function, and disable access to the electronic device when the re-purpose value is greater than a determined value.

* * * * *